(12) United States Patent
Samuthirapandian et al.

(10) Patent No.: US 8,797,191 B2
(45) Date of Patent: Aug. 5, 2014

(54) SYSTEMS AND METHODS FOR DISPLAYING RUNWAY INFORMATION

(75) Inventors: Subash Samuthirapandian, Tamilnadu (IN); Fazurudheen A, Tamilnadu (IN); Chandru Sekaran, Tamilnadu (IN); Narayanan S, Tamilnadu (IN)

(73) Assignee: Honeywell International Inc., Morristown, NJ (US)

( * ) Notice: Subject to any disclaimer, the term of this patent is extended or adjusted under 35 U.S.C. 154(b) by 56 days.

(21) Appl. No.: 13/549,088

(22) Filed: Jul. 13, 2012

(65) Prior Publication Data
US 2014/0015695 A1 Jan. 16, 2014

(51) Int. Cl.
*G01C 21/00* (2006.01)

(52) U.S. Cl.
USPC .................. 340/972; 340/971; 244/114 R

(58) Field of Classification Search
USPC ....... 340/972, 973, 971; 701/212; 244/114 R, 244/160 E; 404/6
See application file for complete search history.

(56) References Cited

U.S. PATENT DOCUMENTS

| | | | |
|---|---|---|---|
| 5,193,764 A * | 3/1993 | Larratt et al. | 244/110 R |
| 5,343,395 A | 8/1994 | Watts | |
| 5,398,186 A | 3/1995 | Nakhla | |
| 6,726,400 B1 * | 4/2004 | Angley et al. | 404/27 |
| 7,535,381 B2 | 5/2009 | Marsh et al. | |
| 7,689,328 B2 | 3/2010 | Spinelli | |
| 7,852,236 B2 | 12/2010 | Feyereisen et al. | |
| 8,126,600 B2 | 2/2012 | Conner et al. | |
| 8,579,542 B2 * | 11/2013 | Narmo | 404/71 |
| 2003/0060940 A1 | 3/2003 | Humbard et al. | |
| 2003/0102987 A1 | 6/2003 | Walter | |
| 2003/0105581 A1 | 6/2003 | Walter | |
| 2005/0006524 A1 | 1/2005 | Villaume et al. | |
| 2005/0261814 A1 | 11/2005 | Ryan et al. | |
| 2009/0166469 A1 * | 7/2009 | Prevost et al. | 244/110 R |
| 2010/0026525 A1 | 2/2010 | Feyereisen et al. | |
| 2010/0071474 A1 | 3/2010 | Zou et al. | |
| 2010/0127895 A1 | 5/2010 | Wilson et al. | |
| 2010/0161160 A1 | 6/2010 | Wilson et al. | |
| 2010/0250030 A1 | 9/2010 | Nichols et al. | |
| 2011/0087388 A1 | 4/2011 | Watson et al. | |
| 2011/0090096 A1 | 4/2011 | Goh et al. | |

FOREIGN PATENT DOCUMENTS

EP 2355071 A1 8/2011

OTHER PUBLICATIONS

U.S. Department of Transportation Federal Aviation Administration, Order No. 5200.8, Runway Safety Area Program, Issued on Oct. 1, 1999 by the Office of Airport Safety and Standards, Airport Engineering Division (AAS-100).

U.S. Department of Transportation Federal Aviation Administration, Engineered Materials Arresting Systems (EMAS) for Aircraft Overruns, Advisory Circular by the Office of Airport Safety and Standards, Airport Engineering Division (AAS-100), AC No. 150/5220-22A, Sep. 30, 2005.

(Continued)

*Primary Examiner* — Toan N Pham
(74) *Attorney, Agent, or Firm* — Ingrassia Fisher & Lorenz, P.C.

(57) ABSTRACT

A display system and method for an aircraft are provided. The display device includes a processing unit configured to receive arrestor bed information associated with a runway and to generate display commands based on the arrestor bed information; and a display device coupled the processing unit and configured to receive the display commands and to display symbology representing the arrestor bed information.

20 Claims, 6 Drawing Sheets

(56) References Cited

OTHER PUBLICATIONS

Engineered Materials Arresting Systems (EMAS) for Aircraft Overruns—Federal Aviation Administration Advisory Circular, Sep. 30, 2005; retrieved from the Internet on Dec. 10, 2013, URL: http://www.faa.gov/documentLibrary/media/advisory_circular/150-5220-22A/150_5220_22a.pdf.

EP search report for application No. 13 174 110.0 dated Dec. 20, 2013.

EP Examination Report for application No. 13 174 110.0 dated Jan. 16, 2014.

* cited by examiner

SYSTEMS AND METHODS FOR DISPLAYING RUNWAY INFORMATION

TECHNICAL FIELD

The present invention generally relates to systems and methods for displaying aircraft runway information.

BACKGROUND

Takeoff and landing are the most demanding tasks in flying. For example, during the landing approach, the pilot must evaluate if the aircraft may safely land or if the landing attempt should be aborted. The time allocated to this task is very limited given the airspeed of the aircraft and the typical or nominal reaction time of the pilot. Issues that may complicate landing situations include unfamiliarity with the airport or runway, low visibility, angle of approach, and turbulent or crosswind situations. As such, during aircraft operation, it is important to provide the pilot with accurate and timely information that facilitates effective flight management.

Computer generated aircraft displays have become highly sophisticated and capable of displaying a substantial amount of flight management, navigation, and control information that gives flight crews more effective control of the aircraft and a reduction in workload during a normal flight situation and/or a low visibility, instrument situation. In this regard, electronic displays, such as head up displays (HUDs) and head down displays (HDDs), are used in aircraft as primary flight displays. For example, the primary flight display can combine critical flight instrumentation (e.g., altitude, attitude, heading, airspeed, vertical speed instruments) and primary engine instrument indicators into a single, readily interpretable display. Although conventional primary flight displays may provide some assistance to the pilot during normal and instrument situations, such displays are typically not as helpful during landing situations.

Accordingly, it is desirable to provide visual displays that improve situational awareness, particularly during landing situations. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system for an aircraft is provided. The display device includes a processing unit configured to receive arrestor bed information associated with a runway and to generate display commands based on the arrestor bed information and a display device coupled the processing unit and configured to receive the display commands and to display symbology representing the arrestor bed information.

In accordance with another exemplary embodiment, a method is provided for displaying aircraft information during a landing or takeoff operation. The method includes determining a runway associated with the landing or takeoff operation; retrieving arrestor bed information for the runway; and displaying the arrestor bed information on a visual display.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein relate to systems and methods for displaying aircraft information to a pilot or user. In some exemplary embodiments, the systems and methods include displaying runway information to the pilot, particularly information about arrestor beds that may be located at the end of a runway. Accordingly, the pilot may have immediate and accurate runway information to avoid undesirable entry into an arrestor bed or to consider using the arrestor bed during an emergency.

Figure 1:
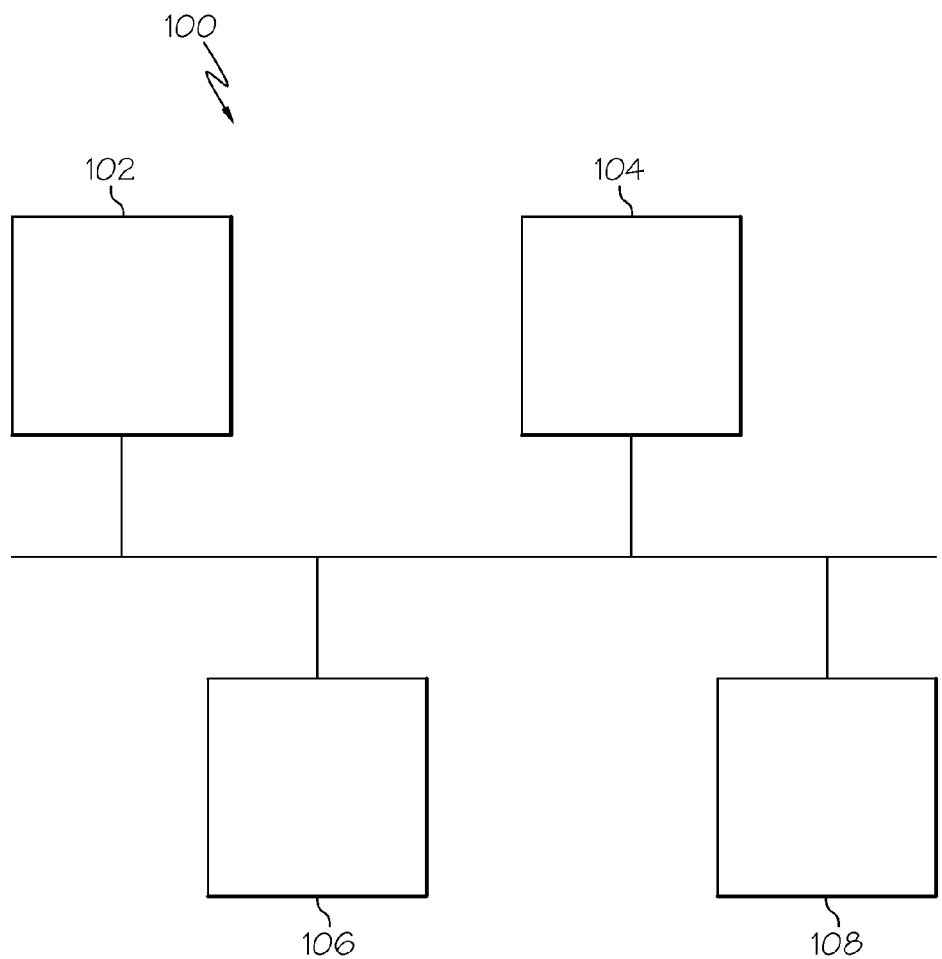
FIG. 1 is a block diagram of an aircraft visual display system in accordance with an exemplary embodiment.

FIG. 1 depicts a block diagram of an exemplary aircraft visual display system 100 for displaying runway information during a landing situation and/or a takeoff situation. In the exemplary embodiment shown, the system 100 includes a processing unit 102, a database 104, a flight management system 106, and a display device 108. Although the system 100 appears in FIG. 1 to be arranged as a single system on a data communications bus or systems bus, the system 100 is not so limited and can also include an arrangement whereby one or more of the processing unit 102, the database 104, the flight management system 106, and the display device 108 are separate components or subcomponents of another system located either onboard or external to an aircraft. Also, for example, the system 100 can be arranged as an integrated system (e.g., aircraft display system, primary flight display system, a head up display with Synthetic Vision Systems (SVS) or Enhanced Vision System (EVS) as an overlay, a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). Although not shown, other components, such as a communication system, may form part of system 100. The system 100 may be utilized in an aircraft, such as a helicopter, airplane, or unmanned vehicle. Moreover, equivalent embodiments of the system 100 may also be utilized in spacecraft, ships, submarines, and other types of vehicles. For simplicity, embodiments are described below with reference to "aircraft."

The processing unit 102 may be a computer processor associated with a primary flight display or other type of aircraft display. Generally, the processing unit 102 receives and/or retrieves flight management information (e.g., from the flight management system 106) and landing, target and/or terrain information (e.g., from database 104). The processing unit 102 may function as a graphics display generator to generate display commands based on algorithms or other machine instructions stored in the processing unit 102 or in separate memory components. The display commands may represent navigation and control information such as a zero pitch reference line, heading indicators, tapes for airspeed and altitude, terrain information, flight path information, required navigation performance (RNP) information, and any other information desired by a flight crew. As discussed in further detail below, the processing unit 102 additionally calculates and generates display commands representing runway information. The processing unit 102 then sends the generated display commands to a display device (e.g., the display device 108). More specific functions of the processing unit 102 will be discussed below.

Database 104 is coupled to processing unit 102 and may be a memory device (e.g., non-volatile memory, disk, drive, tape, optical storage device, mass storage device, etc.) that stores digital landing, waypoint, and target location as either absolute coordinate data or as a function of an aircraft's position. Database 104 may also include, for example, a terrain database, which includes the locations and elevations of natural and manmade terrain. Database 104 may additionally include other types of navigation information, such as information relating to the aircraft and airport runways. As used herein, the term "runway" may include any landing or takeoff area, including a landing strip, taxiway, airstrip, and surrounding areas, and the terms "runway data" and "runway information" may include any information associated with a runway, particularly as discussed in greater detail below. The runway data may be obtained from airports, Runway Awareness and Advisory System (RAAS), and airport mapping database (AMDB). The runway data may include, for example, the length, altitude and gradient of the intended landing runway. The runway data may also include a map of the airport, which includes data defining the runways at the airport, including the runway identifications, runway markings (e.g., symbols and stripes painted on the surface of the runway) and other references. The runway data may be used to compare aircraft position with various aspects of the runway environment to subsequently generate a synthetic view of the runway environment relative to the aircraft, as discussed below. Data in the database 104 may be uploaded prior to flight or received from external sources, such as an airport transmitter or onboard sensors.

Database 104 may further include aircraft data obtained from the Federal Aviation Administration (FAA) and aircraft manufacturers, such as from aircraft flight manuals. The aircraft data may also include aircraft characteristics as a function of, for example, aircraft weight, with corrections based on, for example, wind direction, runway slope, runway surface condition, atmospheric altitude and outside temperature. The aircraft data may also include a list of manufacturer or company regulations defining various aspects of flight, particularly landing. As also discussed below, the aircraft data may further include information such as nose geometry, pilot seated position, pilot eye reference point and windshield configuration.

As more specifically discussed below, the runway information stored in database 104 may include details related to arrestor beds. One example of an arrestor bed is an Engineering Material Arresting System (EMAS). At some airports, an arrestor bed may be positioned at the end of a runway in lieu of or in addition to a runway safety area. In general, an arrestor bed is a section of material at the end of a runway that functions to stop or slow an aircraft during a runway overrun event. The material of the arrestor bed has different characteristics than that of the runway. For example, the arrestor bed may include a bed of material having closely controlled strength and density, such as frangible, aerated (e.g., crushable) concrete. When the aircraft rolls onto the arrestor bed, the tires of the aircraft sink into the material, and the aircraft is decelerated by having to roll through the material without significant damage to the aircraft. Typically, arrestor beds operate independently of runway friction conditions, airplane braking action, and weather conditions. Characteristics of the arrestor bed may be defined by the FAA (or similar flight regulations, including company, state, local or foreign regulations). However, some airports or runways may not have arrestor beds, and for those airports that do, each runway may have an arrestor bed with unique characteristics. As such, the database 104 stores arrestor bed information for individual runways. As an example, the database may include a table with arrestor bed information for various runways or various airports stored according to latitude and longitude, which may be accessed by the flight management system 106 and/or pilot.

The flight management system 106 is coupled to processing unit 102 and may provide navigation data associated with the aircraft's current position and flight direction (e.g., heading, course, track, etc.) to the processing unit 102. The navigation data provided to the processing unit 102 may also include information about the aircraft's airspeed, altitude, pitch, flight path, intended destination, takeoff and landing information, and other important flight information. For example, the flight management system 106 may generate a flight plan for the aircraft that includes flight paths between waypoints to a destination, which may include an airport runway. In exemplary embodiments, the flight management system 106 may include any suitable position and direction determination devices that are capable of providing the processing unit 102 with at least an aircraft's current position, the real-time direction of the aircraft in its flight path, the waypoints along the flight path, and other important flight information (e.g., elevation, pitch, airspeed, altitude, attitude, etc.). Information can be provided to the processing unit 102 by, for example, an Inertial Reference System (IRS), Air-data Heading Reference System (AHRS), and/or a global positioning system (GPS).

The system 100 also includes the display device 108 coupled to the processing unit 102. The display device 108 may include any device or apparatus suitable for displaying flight information or other data associated with operation of the aircraft, including various types of computer generated symbols and information representing at least pitch, heading, flight path, airspeed, altitude, runway information, waypoints, targets, obstacle, terrain, and RNP data in an integrated, multi-color or monochrome form. Using data retrieved (or received) from the flight management system 106 or database 104, the processing unit 102 executes one or more algorithms (e.g., implemented in software) for determining the position of the various types of desired information on the display device 108. As noted above, the processing unit 102 then generates display commands representing this data, and sends display commands to the display device 108.

The display device 108 and/or processing unit 102 may include a graphics display generator for generating the appropriate symbology on the screen of the display device 108, as discussed in greater detail below.

In this embodiment, the display device 108 is an aircraft primary flight display located within a cockpit of the aircraft. It should be appreciated that, in practice, the display device 108 may be located outside the aircraft (e.g., on the ground as part of an air traffic control center or another command center) and communicatively coupled to the flight management system 106. Any suitable type of display medium capable of visually presenting multi-colored or monochrome flight information for a pilot or other flight crew member may be provided, such as, for example, various CRT and flat-panel display systems (e.g., CRT displays, LCDs, OLED displays, plasma displays, projection displays, HDDs, HUDs, etc.). Although not shown, a user interface may also be located within the cockpit of the aircraft and adapted to allow a user (e.g., pilot, co-pilot, or crew member) to interact with the system 100. Such a user interface may be realized as a keypad, touchpad, keyboard, mouse, touchscreen, joystick, microphone, or another suitable device adapted to receive input from a user.

In an exemplary embodiment and discussed in greater detail below, the system 100 may operate to provide information to the pilot related to the runway information discussed above, particularly arrestor bed information. In particular, during a landing situation, the flight management system 106 accesses database 104 for information concerning arrestor beds associated with a designated runway of a particular airport. The flight management system 106 provides the arrestor bed information to the processing unit 102, which generates graphical symbology representing the arrestor bed information to the pilot on the display device 108. As such, the pilot is made aware of the presence and location of the arrestor bed in order to prevent undesired entry into the arrestor bed or to enable use of the arrestor bed in an emergency situation. Similarly, the arrestor bed information may also be provided to the pilot during a takeoff situation to prevent undesired entry or tail strike into the arrestor bed or to enable use of the arrestor bed in an emergency situation. In some exemplary embodiments, the flight management system 106 may consider the kinematic state of the aircraft (e.g., the speed, altitude, direction, etc.) and/or the flight plan or landing procedure of the aircraft, and based on this information, evaluate the aircraft relative to the arrestor bed. If this information indicates that the aircraft will undesirably enter the arrestor bed, the system 100 may provide a warning to the pilot.

Figure 2:
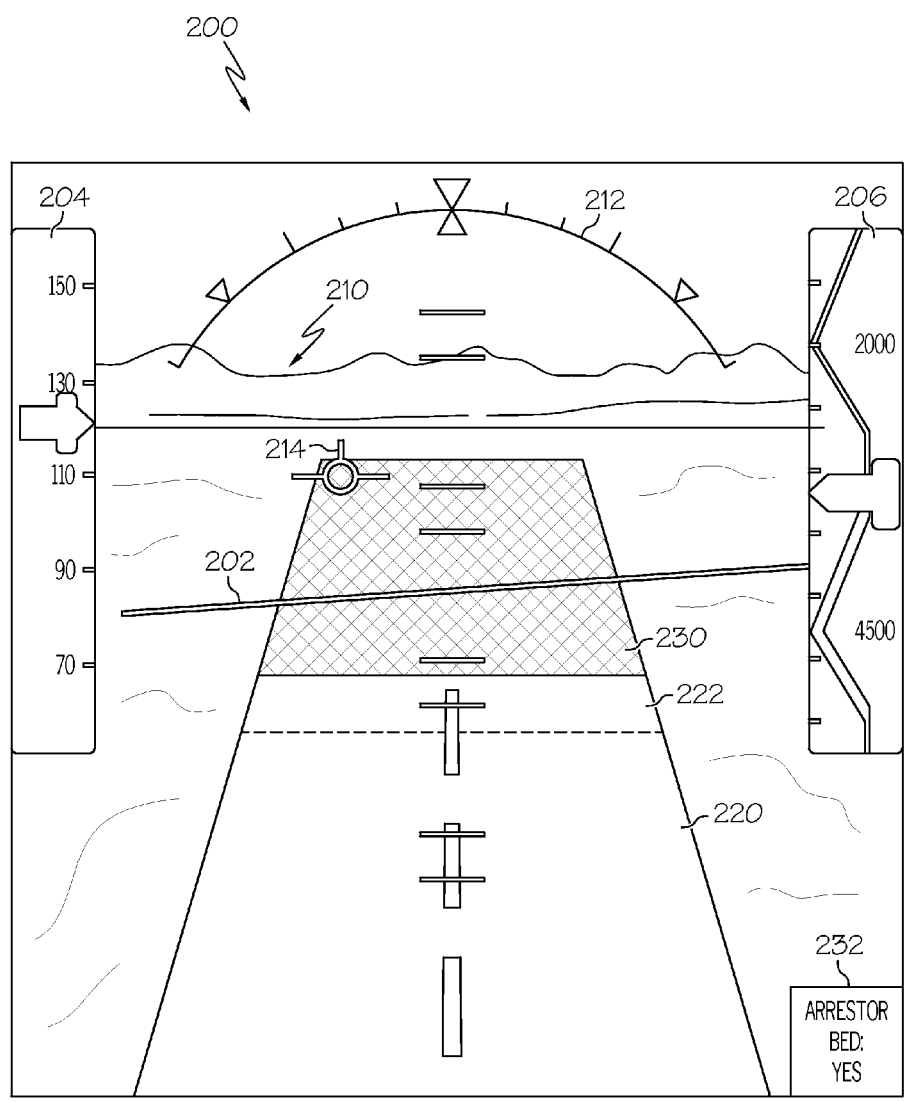
FIG. 2 is a visual display generated by the display system of FIG. 1 in accordance with an exemplary embodiment.

FIG. 2 is a visual display 200 generated by the aircraft visual display system 100 of FIG. 1 in accordance with a first exemplary embodiment. As such, FIG. 1 is referenced in the discussion of FIG. 2 below. The visual display 200 may be produced, for example, on the display unit 170 discussed above, and in this embodiment, may correspond to a primary flight display. FIG. 2 may be, for example, a synthetic vision system (or terrain) view. For example, the aircraft visual display 200 may display and/or render an aircraft environment associated with a current (or instantaneous) location of the aircraft.

The visual display 200 shows, among other things, computer generated symbols (e.g., generated by the guidance system 130) representing a zero pitch reference line 202, an airspeed scale or tape 204, and an altitude scale or tape 206. Although the visual display 200 is shown as an egocentric, first-person frame of reference, the visual display 200 can be a secondary, wingman, and/or plan or perspective view that enables a viewer to view the aircraft, as well as zoom in and out. Although the visual display 200 is generally associated with a primary flight display, the display can also be utilized on a multi-function display, head up display, and/or a head mounted display.

In this embodiment, the visual display 200 further includes terrain (e.g., identified generally as element 210) corresponding to (or within a given distance of) a location of the aircraft. Terrain 210 is rendered as a three-dimensional, perspective view, and can include any representation of the environment surrounding the aircraft, including flattened terrain. In one embodiment, terrain 210 includes natural and man-made obstacles, including building and navigational positions, such as waypoint symbology (not shown). In the landing environment depicted by FIG. 2, the visual display 200 includes symbology representing a runway 220. Other symbology depicted in FIG. 2 includes an attitude indicator 212 and a flight path vector 214. Other types of symbology may be provided.

During flight, even in ideal situations, it may be difficult to remove attention from cockpit instrumentation or displays, look out the window, orient a visual point of view relative to the runway and aircraft, and estimate the presence and the position of an arrestor bed. Upon visual inspection for a cockpit window, the arrestor bed may be similar in color to the runway and difficult to distinguish. This task may be more difficult in low visibility conditions or when the aircraft is crabbing during a crosswind, i.e., the longitudinal axis not being aligned with the longitudinal axis of the runway, thus resulting in the runway not appearing directly in front of the pilot. Moreover, some airports do not have arrestor beds. As described in greater detail below, the visual display 200 enables the pilot to more easily identify the arrestor bed associated with a runway.

Accordingly, the visual display 200 further includes arrestor bed symbology 230. In this embodiment, the arrestor bed symbology 230 corresponds to the size and shape of the arrestor bed relative to the surrounding terrain 210 (e.g., in the same scale), including the runway 220, so as not to obscure other information on the visual display 200 in a primary field of view while providing the desired information. As shown, the arrestor bed symbology 230 may be different than the symbology representing the runway 220 and other surrounding terrain 210 (e.g., such as in a different color or highlighted) to draw attention to the arrestor bed. As such, the arrestor bed symbology 230 enables the pilot to ascertain the presence, location, and size of the arrestor bed so as to avoid or use the arrestor bed, as desired or necessary. At times, a runway will have a runway safety area between the end of the main portion of the runway and the arrestor bed. In such cases, runway safety symbology 222 will be displayed between the runway 220 and the arrestor bed symbology 230.

Figure 3:
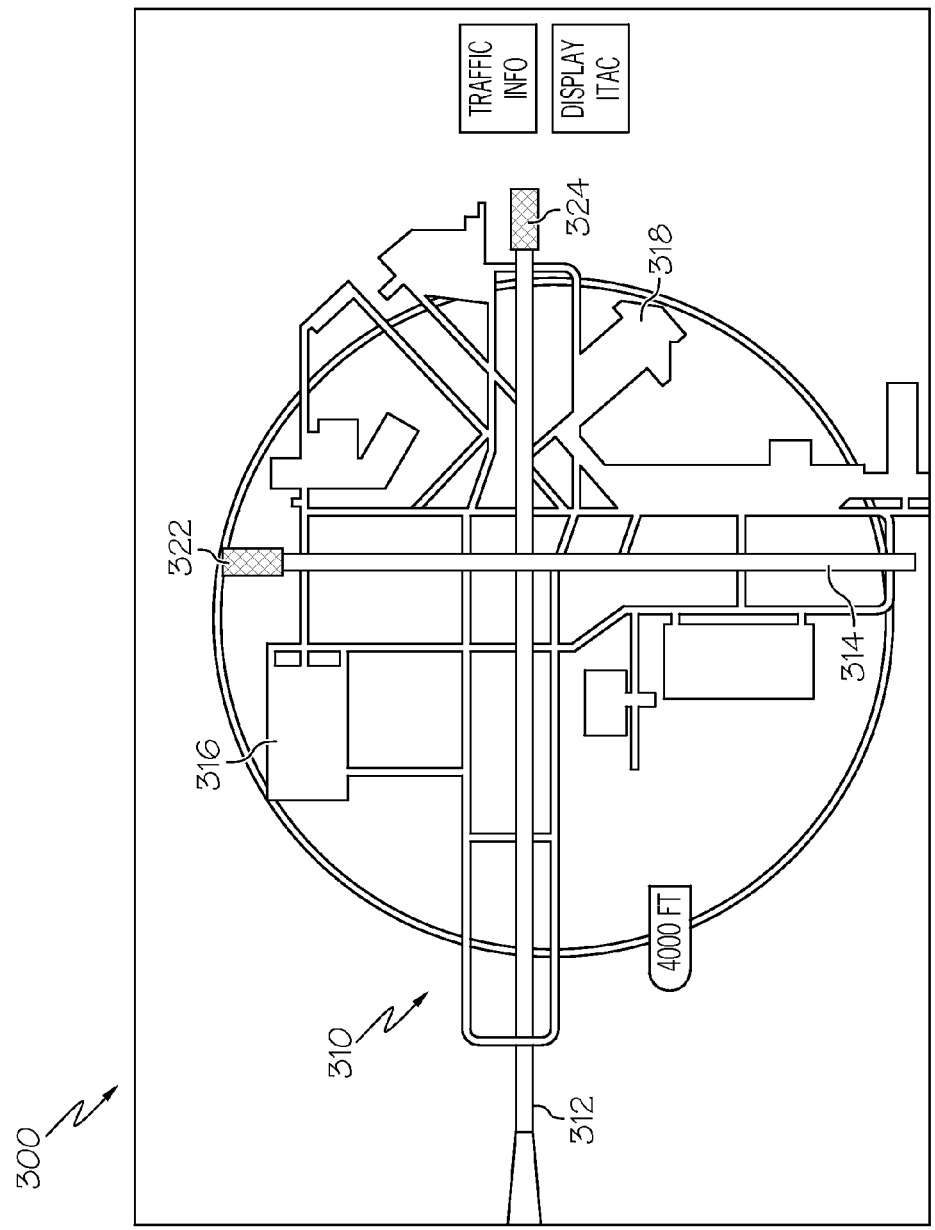
FIG. 3 is a visual display generated by the display system of FIG. 1 in accordance with an additional exemplary embodiment.

In addition to the arrestor bed symbology 230 discussed above, the visual display 200 may provide additional or alternative symbology or indications about the arrestor beds. As an example, the visual display 200 may display a text-based message 232 to the pilot, such as "ARRESTOR BED: YES" to indicate that the designated runway for landing has an arrestor bed. Other text-based messages may include information about the arrestor beds, such as dimension or relative location. Further embodiments may include aural warnings that announce the presence and/or characteristics of the arrestor beds FIG. 3 is a visual display 300 generated by the system 100 of FIG. 1 in accordance with a second exemplary embodiment. The visual display 300 of FIG. 3 is a plan view of an airport moving map. As shown, the visual display 300 includes representations of the airport 310, including runways 312, 314 and buildings 316, 318. As also shown in FIG. 3, the visual display 300 may include arrestor bed symbology 322, 324 to enable the pilot to quickly identify the presence and location of the arrestor beds in any of the runways in the view of the visual display 300.

Figure 4:
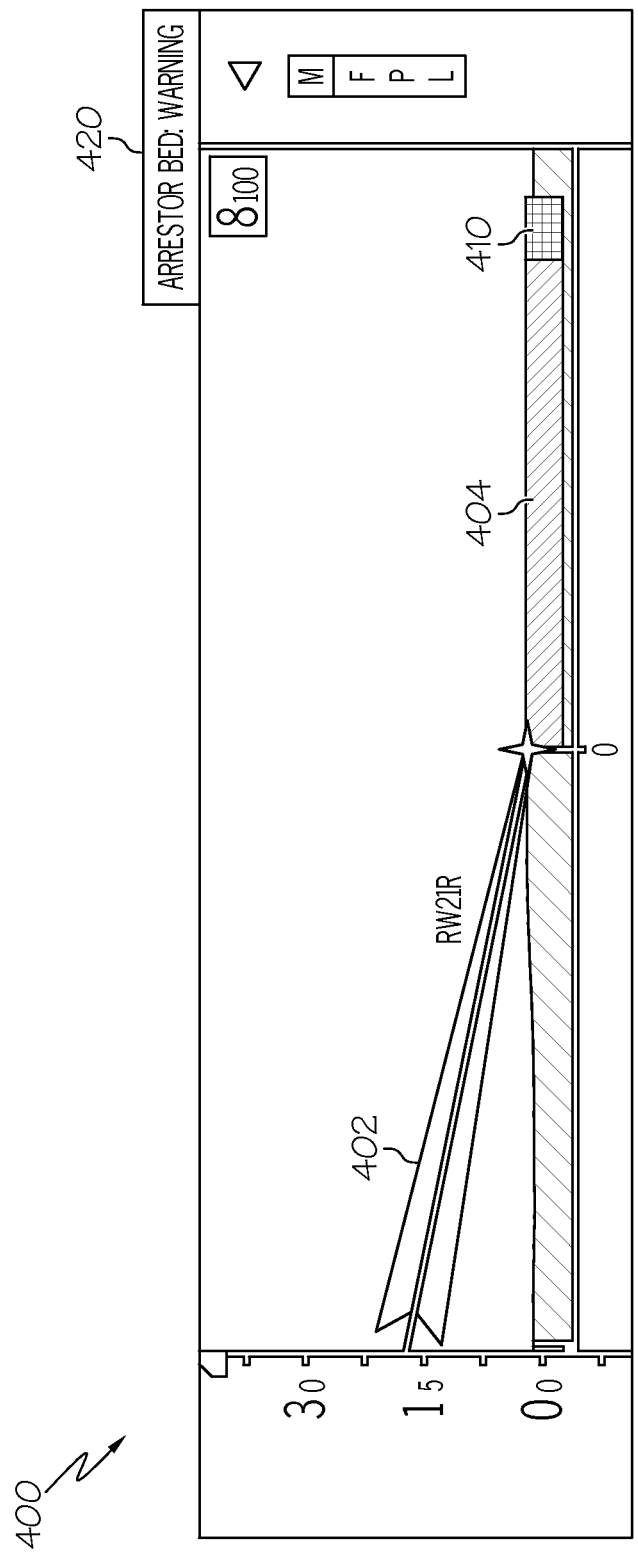
FIG. 4 is a visual display generated by the display system of FIG. 1 in accordance with a further exemplary embodiment.

FIG. 4 is a visual display 400 generated by the system 100 of FIG. 1 in accordance with a second exemplary embodiment. The visual display 400 of FIG. 4 is an elevation view and illustrates the vertical profile of the aircraft. In particular, the visual display 400 illustrates a representation of a vertical flight path 402 as the aircraft approaches a runway 404. As also shown in FIG. 4, the visual display 400 may include arrestor bed symbology 410 to enable the pilot to quickly identify the presence and location of the arrestor bed.

As noted above, the visual display 400 may provide additional or alternative symbology or indications about the arrestor beds. In one exemplary embodiment, the system 100 (FIG. 1) may consider the location of the arrestor bed relative to the aircraft. In other words, the system 100 may consider the kinematic state of the aircraft (e.g., the speed, altitude, direction, etc.) and/or the flight plan or landing procedure of the aircraft, and based on this information, evaluate the aircraft relative to the arrestor bed. If this evaluation indicates that the aircraft will undesirably enter the arrestor bed, the system 100 may provide a warning to the pilot. In the visual display 400 of FIG. 4, a warning 420 in the form of a text message "ARRESTOR BED: WARNING" is provided to indicate that the aircraft may enter the arrestor bed. In other embodiments, the warning may be audible or in an alternate visual form.

Figure 5:
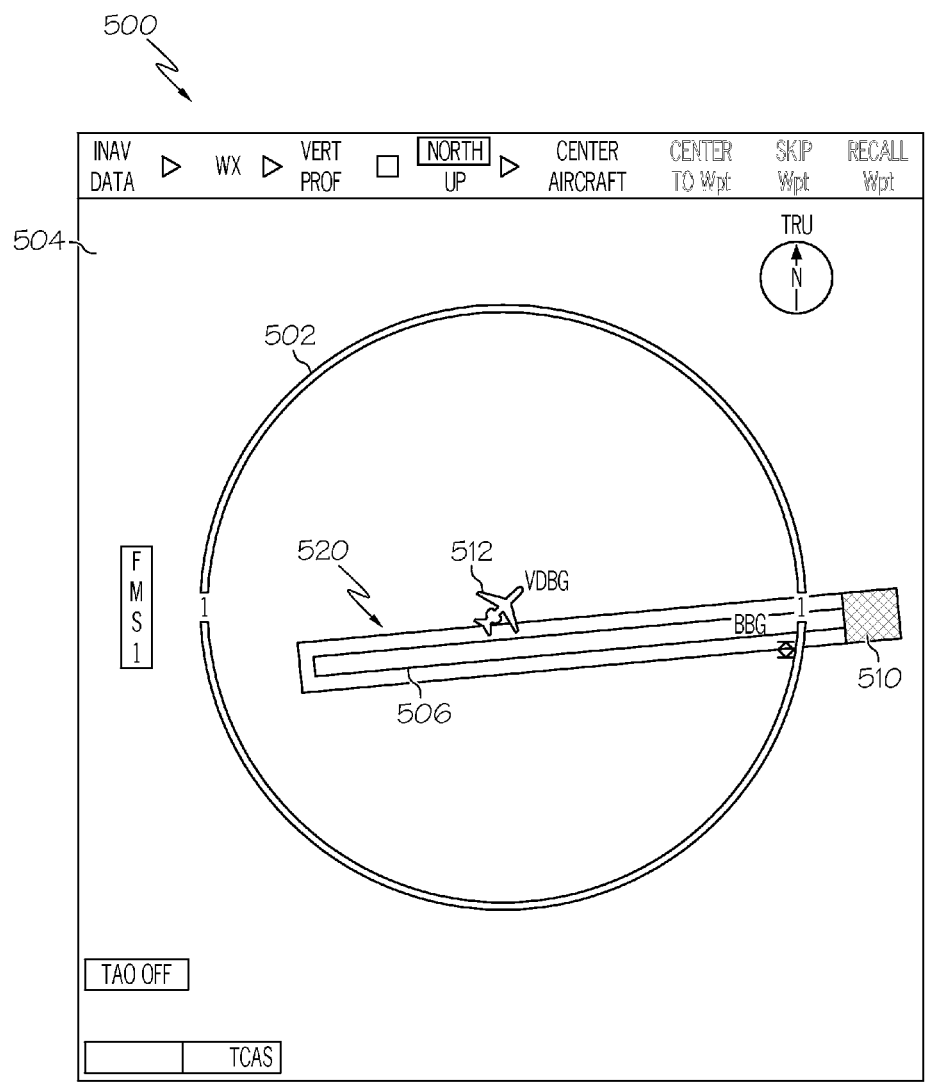
FIG. 5 is a visual display generated by the display system of FIG. 1 in accordance with a further exemplary embodiment.

FIG. 5 is a visual display 500 generated by the system 100 of FIG. 1 in accordance with a further exemplary embodiment. The visual display 500 of FIG. 5 is a navigation or lateral map display, is a computer generated top-view of the aircraft, represented as an aircraft symbol 512, and the surrounding environment based on information provided by the flight management system 106 and other system components of FIG. 1. Generally, the pilot may zoom in and out of the display 500 to depict the desired display elements. In the view of FIG. 5, the display 500 includes symbology representing range rings 502, terrain information 504, and a runway 506. As also shown in FIG. 5, the visual display 500 may include arrestor bed symbology 510 and safety area symbology 520 to enable the pilot to quickly identify the presence and location of the arrestor bed and runway safety area.

Figure 6:
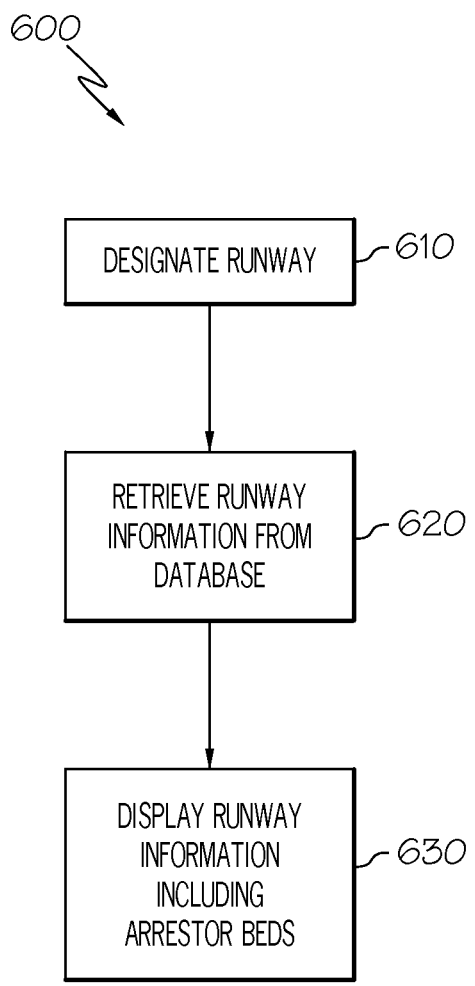
FIG. 6 is a flowchart of a method for generating a visual display in accordance with an exemplary embodiment.

FIG. 6 is a flowchart of method 600 for displaying runway information, particularly arrestor bed information. With continued reference to FIG. 1, the display method 600 may be performed to display or present arrestor bed information during landing or takeoff at an airport runway on a display device in order to enable a user, such as a pilot or crew member, to identify and/or locate the arrestor bed efficiently and accurately. In a first step 610, a runway of an airport is designated for landing. The runway may be specified by the flight plan generated by the flight management system 106, supplied by air traffic control, and/or selected by a pilot. In a second step 620, the processing unit 102 retrieves information associated with the airport, and particularly the runway. In general, the information includes information about the presence and location of arrestor beds. In a third step 630, the processing unit 102 generates a visual display of the landing environment, including symbology representing the runway and the arrestor bed. The visual display may be in any suitable format, including a 3D synthetic vision system view, an airport moving map, a vertical profile, and/or a lateral map display. In an exemplary embodiment, the visual display is associated with the movement of the aircraft and refreshes or updates as the aircraft travels such that the graphical representation of the environment, including the arrestor bed, relative to the aircraft accurately reflects the current (e.g., instantaneous or substantially real-time) real-world positioning.

Accordingly, during a landing or takeoff operation, a pilot may view runway information on the visual display and immediately identify the presence and position of the arrestor beds. Based on this information, the pilot knows the position of the arrestor beds on the ground relative to the aircraft and the runway. This enables the pilot to have complete situational awareness of the arrestor beds for an individual runway of a particular airport without visually searching out the window, reviewing reference charts, and/or communicating with air traffic control. As such, exemplary embodiments provide improved aircraft displays and display methods in a manner that is more intuitive and more easily grasped by a pilot, conveys more clearly a geometric picture related to the actual flight path and navigational limitations, and is within the pilot's primary scan area at all times while not interfering with unrelated information. Such symbology facilitates flight crew or operator situational awareness and vehicle control, which reduces pilot or operator workload and navigation errors, and thus results in increased aircraft and/or navigation safety.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
    a processing unit configured to receive arrestor bed information associated with a runway and to generate display commands based on the arrestor bed information; and
    a display device coupled to the processing unit and configured to receive the display commands and to display symbology representing the arrestor bed information.

2. The display system of claim 1, further comprising a database coupled to the processing unit and configured to store the arrestor bed information for a plurality of runways.

3. The display system of claim 1, further comprising a flight management system coupled to the processing unit and configured to provide a flight plan with the runway to the processing unit.

4. The display system of claim 1, wherein the processing unit is configured to generate display commands representing an environment of the aircraft, and wherein the display device is configured to display the symbology representing the arrestor bed information within a synthetic view of the environment of the aircraft.

5. The display system of claim 4, wherein the environment of the aircraft includes the runway, and wherein display device is configured to display the symbology representing the arrestor bed information in a color different from the runway.

6. The display system of claim 4, wherein the environment of the aircraft includes the runway, and wherein display device is configured to display the symbology representing the arrestor bed information highlighted relative to the runway.

7. The display system of claim 6, wherein the environment of the aircraft includes the runway, and wherein display device is configured to display the symbology representing the arrestor bed information in a scale approximately equal to that of the runway.

8. The display system of claim 1, wherein processing unit is configured to selectively generate a warning based on the arrestor bed information.

9. The display system of claim 1, wherein the display device is configured to display the arrestor bed information as part of a plan view.

10. The display system of claim 1, wherein the display device is configured to display the arrestor bed information as part of an elevation view.

11. The display system of claim 1, wherein the display device is a primary flight display.

12. The display system of claim 1, wherein the display device is a head down display.

13. A method for displaying aircraft information during a landing or takeoff operation, comprising the steps of:
    determining a runway associated with the landing or takeoff operation;
    retrieving arrestor bed information for the runway; and
    displaying the arrestor bed information on a visual display.

14. The method of claim 13, wherein the retrieving step includes retrieving the arrestor bed information from a database configured to store the arrestor bed information for a plurality of runways.

15. The method of claim 13, wherein the determining step includes determining the runway from a flight plan.

16. The method of claim 13, wherein the displaying step includes displaying the arrestor bed information within a synthetic view of the runway.

17. The method of claim 16, wherein the displaying step includes displaying the arrestor bed information in a color different from the runway.

18. The method of claim 17, wherein the displaying step includes highlighting the arrestor bed information relative to the runway.

19. The method of claim 17, wherein the displaying step includes displaying the arrestor bed information in a scale approximately equal to that of the runway.

20. The method of claim 13, further comprising the step of selectively generating a warning based on the arrestor bed information.

* * * * *